United States Patent  [15] 3,694,431
Fuchs et al. [45] Sept. 26, 1972

[54] PREPARATION OF 1-(CARBAMOYL)-N-(CARBAMOYLOXY)-THIOFORMIMIDATES FROM ACETOACETAMIDES

[72] Inventors: Julius J. Fuchs, 1104 Greenway Road, Wilmington, Del. 19803; Harvey M. Loux, 115 Summerset Drive, Hockessin, Del. 19707

[22] Filed: Sept. 16, 1970

[21] Appl. No.: 72,793

Related U.S. Application Data

[63] Continuation-in-part of Ser. No. 787,594, Dec. 27, 1968, abandoned.

[52] U.S. Cl.......260/239 A, 260/239 BF, 260/239 E, 260/293.86, 260/326.8, 260/326.82, 260/453 R, 260/543 A, 260/543 R, 260/561 K, 260/561 HL, 260/999
[51] Int. Cl. ............................................... C07d 29/22
[58] Field of Search.......260/561 K, 561 HL, 293.86, 260/326.8, 239 BF, 239 E, 239 A

[56] References Cited

UNITED STATES PATENTS 3,449,421   6/1969   Pearson ..................260/561 K

OTHER PUBLICATIONS

Naik et al., Journ. Ind. Chem. Soc. 20, pp. 384–388

*Primary Examiner*—Lewis Gotts
*Assistant Examiner*—Ethel G. Love
*Attorney*—Don M. Kerr

[57] ABSTRACT

1-(Carbamoyl)-N-(carbamoyloxy)thioformimidates such as methyl 1-(carbamoyl)-N-methylcarbamoyloxy)thioformimidate and methyl 1-(dimethylcarbamoyl)-N-(methylcarbamoyloxy)thioformimidate are prepared by the steps of a. reacting diketene with ammonia or an amine to obtain an acetoacetamide;
b. reacting the product of (a) with a nitrosating agent in the presence of water or an alcohol;
c. chlorinating the product of (b) at a temperature of −10 to 75° C.;
d. reacting the product of (c) with an alkyl mercaptan and a base or with a metal salt of an alkyl mercaptan; and
e. reacting the product of (d) with
 1. a carbamoyl chloride in the presence of a base;
 2. phosgene followed by reaction with an amine; or
 3. an isocyanate, optionally in the presence of a basic catalyst; in water or organic solvents such as acetone, methylene chloride, methyl ethyl ketone, methyl isobutyl ketone, dimethylformamide, dimethylacetamide, dimethylsulfoxide, tetramethylurea or their mixtures.

2 Claims, No Drawings

PREPARATION OF 1-(CARBAMOYL)-N-(CARBAMOYLOXY)-THIOFORMIMIDATES FROM ACETOACETAMIDES

CROSS-REFERENCE TO RELATED APPLICATION

This application is a continuation-in-part of application Ser. No. 787,594, filed Dec. 27, 1968, now abandoned.

BACKGROUND OF THE INVENTION

This invention relates to methods for preparing 1-(carbamoyl)-N-(carbamoyloxy)thioformimidates. More particularly this invention is directed to methods of preparing the thioformimidates by reacting diketene with ammonia or an amine, reacting the product with nitrous acid or other nitrosating agent, chlorinating the product of that reaction, then reacting the chlorination product with an alkyl mercaptan and a base, and then preparing the desired thioformimidate by reaction either with a suitable carbamoyl chloride in the presence of a base or with phosgene, followed by reaction with an amine, or with an isocyanate usually in the presence of a basic catalyst.

The product thioformimidates are useful as pesticides and can be prepared in the manner disclosed in copending application Ser. No. 728,739, filed May 13, 1968, now U.S. Pat. No. 3,530,220. They can also be prepared from glyoxylic acid in the manner disclosed and claimed in copending application Ser. No. 772,811, filed Nov. 1, 1968, now U.S. Pat. No. 3,584,032.

By the methods of this invention it is possible to prepare the thioformimidates of formula (1) below in a five-step process in which the first four steps or all five steps can be operatively combined. By thus avoiding the necessity to separate and recover intermediate compounds the methods of this invention permit economic preparation of the compounds of formula (1) below in outstanding yield.

SUMMARY OF THE INVENTION

In summary, this invention is directed to the preparation of 1-(carbamoyl)-N-(carbamoyloxy)thioformimidates of the following formula:

(1)
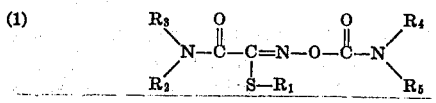

wherein
- $R_1$ is alkyl of one through four carbon atoms or alkenyl of three through four carbon atoms;
- $R_2$ is hydrogen, alkyl of one through four carbon atoms, methoxy, or cycloalkyl of three through five carbon atoms;
- $R_3$ is hydrogen or alkyl of one through four carbon atoms; with the proviso that $R_2$ and $R_3$ can be joined and are alkylene of two through six carbon atoms, and with the limitation that $R_2$ and $R_3$ never total more than seven carbon atoms;
- $R_4$ is alkyl of one through three carbon atoms, allyl or propargyl; and
- $R_5$ is hydrogen or methyl;

by the steps comprising:
a. reacting diketene with ammonia or an amine in the presence of water, an inert organic solvent or the product of the reaction itself;
b. reacting the product of (a) with nitrous acid or other nitrosating agents in the presence of water, methanol, ethanol, isopropanol or their mixtures;
c. chlorinating the product of (b) at a temperature of −10 to 75° C.;
d. reacting the product of (c) with an alkyl mercaptan and a base or with a metal salt of an alkyl mercaptan and
e. reacting the product of (d) with (1) a carbamoyl chloride in the presence of a base; (2) phosgene followed by reaction with an amine; or (3) an isocyanate in the presence or absence of a basic catalyst; in water, acetone, methylene chloride, methyl ethyl ketone, methyl isobutyl ketone, dimethylformamide, dimethylacetamide, dimethylsulfoxide, tetramethylurea or their mixtures.

The compounds of formula (1) and their use as pesticides are described and exemplified in Application Ser. No. 728,739, referred to above.

DESCRIPTION OF THE INVENTION

The process of this invention used in preparing the compounds of formula (1) comprises the five steps enumerated above, and more fully described as follows:

Step a.

The reaction of diketene with ammonia or an amine in the presence of water, an inert organic solvent or the product of the reaction itself, (a) 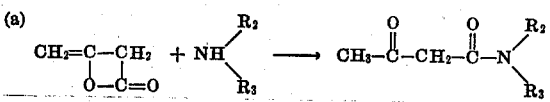

in which $R_2$ and $R_3$ are as defined in formula (1) above.

Equimolecular quantities of diketene and ammonia or an amine are gradually mixed in a solvent such as diethyl ether, benzene, methylene chloride, or water, with water the preferred solvent. In addition the reaction product itself may be used as the reaction solvent. The use of either reactant, diketene on the one hand or ammonia or an amine on the other, in excess of the stoichiometric amount required is permissible but unnecessary and wasteful. The diketene can be added to a solution of ammonia or amine, or the ammonia or amine can be added to a solution of diketene, or both reactants can be added simultaneously to the solvent. It is preferred to add the diketene to an aqueous solution of ammonia or amine.

The reaction is carried out at a temperature between about −20° C. and 80° C., depending on the solvent used. If water is used as solvent a reaction temperature of between about 0° C. and 50° C. is preferred. The time of addition is not critical and depends upon the cooling capacity of the reaction equipment. For economy and convenience it is preferred to keep addition time to a minimum. Addition times of 30 to 60 minutes are ordinarily adequate. The reaction is complete when a stable pH of 6-8, preferably pH 7.0-8.0, is obtained.

At the conclusion of the reaction the product can be isolated by conventional techniques such as by evaporation of the solvent or extraction with an organic solvent, and can be purified by distillation. However, it is ordinarily preferred to run the step (a) reaction in water, and to use the product in the step (b) nitrosation without isolation of the step (a) product.

Step b.

The nitrosation of the acetoacetamide is represented by the following equation (b)
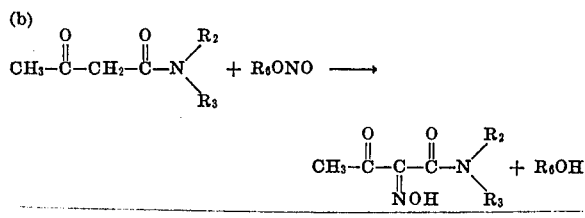

wherein $R_2$ and $R_3$ are as defined above and $R_6$ is hydrogen or alkyl of one to five carbon atoms.

The acetoacetamide and solvent, if not already present from step (a), are charged initially to the reaction vessel. The nitrosating agent is then added as a solid, a liquid, a vapor, or in solution, at a rate such that a reaction temperature between $-10°$ C. and $70°$ C. is maintained. If a metal nitrite is to be used in conjunction with an acid as a nitrosating agent, by generating nitrous acid, the metal nitrite is added to the reaction mixture as rapidly as is convenient, either as a solid or in solution. Then the acid is added at such a rate that the temperature remains between $-10°$ C. and $70°$ C. and preferably between $0°$ C. and $35°$ C. The addition rate of the acid is also controlled so that the pH of the reaction mixture does not go below about 4.0 until about 80 percent of the stoichiometric quantity of acid has been added, based on the amount of metal nitrite used. A final pH of 2.0- 2.5 is attained when the stoichiometric quantity of acid has been added. If the acid is added at a rate so rapid that the pH and temperature control are not maintained, nitrous acid may be liberated too rapidly and enter into undesirable side reactions.

Water, methanol, ethanol, isopropanol and their mixtures are suitable solvents. Of these, water is generally the preferred solvent for reasons of economy and solubility. If step (c) is to be carried out without isolation of the product of this step it is of added importance that this step be carried out in water because of the tendency of some organic solvents to chlorinate under the conditions of step (c).

Suitable nitrosating agents are dinitrogen trioxide; alkyl nitrites; and sodium nitrite, potassium nitrite, and calcium nitrite used in conjunction with an acid such as hydrochloric, sulfuric or acetic. Of these, sodium nitrite in conjunction with hydrochloric acid is the preferred source of nitrous acid because of convenience and economy and ease of handling the by-product sodium chloride.

As stated above, water is the preferred solvent and it is preferred to use water in an amount of about 0.4 liters per mole of the acetoacetamide. Thus when sodium nitrite and hydrochloric acid, the preferred source of nitrous acid, are used to generate nitrous acid the sodium chloride by-product remains in solution, facilitating handling of the reaction mixture.

The nitrosating agent is used in 1 to 5 percent excess over the stoichiometric amount based on the acetoacetamide. Greater or lesser amounts can be used but only at an economic disadvantage.

When an acid is used in conjunction with a metal nitrite, it is used in stoichiometric amounts based on the source of nitrous acid. Use of amounts greater or less than stoichiometric results in waste of one of the reactants.

If desired the product of step (b) can be isolated, such as by filtration or extraction with an organic solvent. However as stated above, when the solvent is water it is preferred to go directly to step (c) without isolating the product of step (b).

Step c.

Step (c) comprises formation of the hydroxamoyl chloride and is illustrated by the equation:

(c)
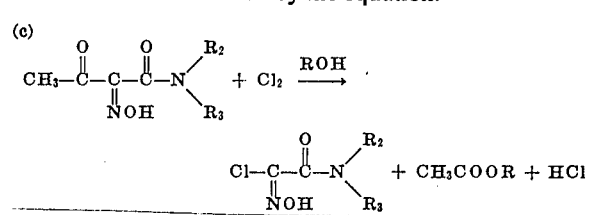

wherein R is hydrogen, methyl, ethyl, or isopropyl.

If the intermediate product of step (b) has been isolated or purified, it is preferred to mix the product with water, cool the mixture and add chlorine. If the step (b) product has not been isolated from the reaction medium of step (b) the product mixture is cooled and chlorinated as is.

The chlorination should be carried out at a temperature between $-10°$ C. and $75°$ C. and preferably between $20°$ C. and $50°$ C. The amount of chlorine used will vary from stoichiometric to 5 percent molar excess but it is preferred to use stoichiometric amounts.

The chlorine is ordinarily added over a period of 30 to 60 minutes although it can be added more rapidly if desired. After addition is complete the mixture is stirred, usually for about 30 to 60 minutes, usually at a temperature of about $20°$ to $50°$ C. The reaction is complete when no further chlorine is absorbed.

Elemental chlorine is the preferred source of chlorine for economic reasons, however other chlorinating agents, such as sulfuryl chloride, can be used if desired.

Suitable solvents include water, methanol, ethanol, isopropanol, their mixtures, or their mixtures with dimethylformamide. For economic reasons water is the preferred solvent and obviously when step (b) product is used without isolating the product from the solvent, step (c) is carried out in the solvent of step (b).

The reaction product of step (c) which crystallizes out during the chlorination in water solution can be isolated, if desired, in high yield and purity by filtration, or it can be used directly without isolation in the reaction of step (d). It is preferred to isolate the product of step (c) before the reaction of step (d) because such a procedure improves the purity of the step (d) product, improves the ease of operation of step (d), and reduces consumption of the base in step (d).

Step (d)

The hydroxamoyl chloride from step (c) is reacted with an alkyl mercaptan and a base in a solvent according to the equation:

(d) 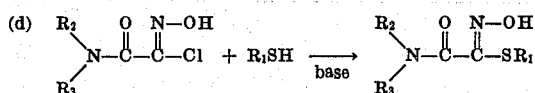

wherein $R_1$ is as defined above.

This reaction is carried out in the presence of water, methanol, ethanol, n-propanol, isopropanol, dimethylformamide or their mixtures, at a temperature between $-10°$ and $70°$ C., preferably between $0°$ and $40°$ C., according to one of the following alternate procedures: 1) The hydroxamoyl chloride, if isolated after step (c), is dissolved in a solvent along with a slight excess of alkyl mercaptan. An aqueous solution of base is then added to accept the HCl liberated during the reaction. This procedure is preferably carried out in methanol as a solvent. The product can be isolated by removing the low boiling solvent by distillation, adding water to the distillation pot as necessary to maintain a practical slurry concentration, followed by filtration. 2) The hydroxamoyl chloride in the reaction medium of step (c) is treated with a pre-prepared solution of a metal salt of an alkyl mercaptan or with the alkyl mercaptan, followed by addition of the aqueous base. More base is required for this procedure than in 1) above because of the additional acetic acid and hydrochloric acid which are present in the reaction mixture of step (c). The product can be isolated by simple filtration if desired.

Bases which are suitable acid acceptors for adjusting the pH are the hydroxides, carbonates and bicarbonates of sodium, potassium, calcium and magnesium. The final pH should be between 5 and 9 and a pH of about 7 is preferred.

As stated, the product can be isolated if desired, or alternatively, if water or dimethylformamide is the solvent, the product mixture can be used as is in step (e). It is usually preferred to isolate the product prior to use in step (e).

Step e.

Conversion of the product of step (d) to the desired formimidate is carried out by reacting the product of step (d) with an isocyanate, or carbamoyl chloride, or phosgene followed by reaction with an amine, according to the equation ($e_1$)

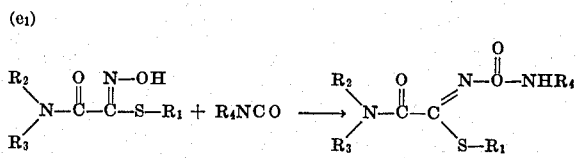

wherein $R_1$, $R_2$, $R_3$, and $R_4$ are as defined above, or ($e_2$)

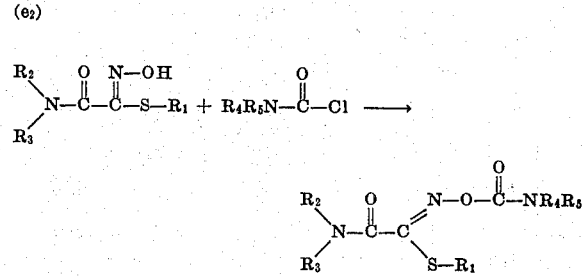

wherein $R_1$, $R_2$, $R_3$, $R_4$, and $R_5$ are as defined above, or ($e_3$)

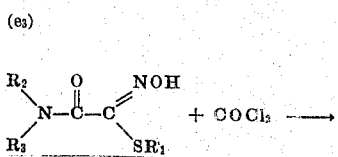

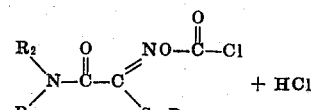

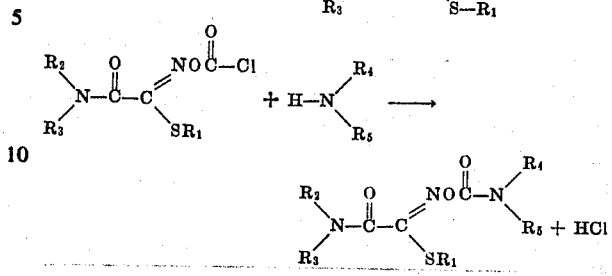

wherein $R_1$, $R_2$, $R_3$, $R_4$ and $R_5$ are as defined above.

The reactions of step (e) are carried out in a solvent such as water, acetone, methyl ethyl ketone, methyl isobutyl ketone, dimethylformamide, dimethylacetamide, tetramethylurea, dimethylsulfoxide, methylene chloride, or their mixtures, at a temperature which can range from below $-10°$ C. to about $55°$ C. At substantially higher temperatures the products exhibit instability. Anhydrous solvents are preferred to avoid possible side-reactions of isocyanate or carbamoyl chloride with water. The reaction of step ($e_1$) is facilitated by the presence of a basic catalyst such as trimethylamine, triethylamine or triethylenediamine. The reaction of step ($e_2$) is carried out in the presence of an equimolar quantity of a base such as triethylamine, trimethylamine or the hydroxides, carbonates or bicarbonates of sodium, potassium, calcium or magnesium. Alternatively, the sodium salt of the product of step (d) can be formed by reaction with a metal hydride such as sodium hydride. The resulting sodium salt can then be reacted with a carbamoyl chloride in an inert solvent such as tetrahydrofuran to obtain products as obtained in the ($e_2$) reaction.

The reactions of step ($e_3$) may be carried out in any of several different ways, for example:

1. The sodium salt of the product of step (d) can be formed by reaction with a metal hydride such as sodium hydride. The resulting sodium salt can be reacted with phosgene in an inert solvent such as tetrahydrofuran followed by reaction with the desired amine,

, and an acid acceptor such as a tertiary amine or a hydroxide, carbonate or bicarbonate of sodium, potassium, calcium and magnesium. The amine itself may be used as the acid acceptor in which event two moles of amine are used.

2. To a solution of a product of step (d) and phosgene in an inert solvent sodium hydroxide is added followed by reaction with the desired amine ($R_4R_5NH$) and an acid acceptor or, as above, two molar portions of the amine may be used with no other acid acceptor needed.

3. To a solution of the product of step (d) and phosgene in an inert solvent three molar portions of the desired amine can be added.

The 1-(carbamoyl)-N-(carbamoyloxy)thioformimidate products of step (e) can be isolated by conventional procedures such as filtration or extraction or may be used in solution as prepared, depending upon the solvent chosen.

Of the steps (a) through (e) the more important are steps (b) and (c) and the most important is step (c) which provides an advantageous method of preparing the chlorinated intermediate. A preferred sequence of reaction is to nitrosate and chlorinate in step (b) and (c) reactions, a previously obtained acetoacetamide prepared by any suitable process step (a), and follow the chlorination with the steps (d) and (e).

As will be evident to those skilled in the art, the steps of this process can be operated separately or together in a continuous manner without departing from the concept of this invention.

The process of this invention is further illustrated in the following examples wherein parts and percentages are by weight unless otherwise noted.

EXAMPLE I

To 86 parts of a 25 percent aqueous solution of dimethylamine is added 200 parts of water, followed by the addition of enough diketene at 20° to 30°C. to give a stable pH of 7; 41.3 parts of diketene are required. To the resulting solution is then added 35 parts of sodium nitrite, followed by the gradual addition of 50 parts of 36 percent aqueous hydrochloric acid under nitrogen atmosphere at 30°C. so that the pH of the solution remains above 4.5 throughout the addition of the first 40 parts of acid. The 2-hydroxyimino-N,N-dimethylacetoacetamide crystallizes toward the end of the hydrochloric acid addition. To the resulting reaction mixture is then added at 30°C. within 45 to 60 minutes 36 parts of chlorine. After agitation for an additional ½ hour, the resulting slurry of dimethylcarbamoylformhydroxamoyl chloride is split into two batches and converted in two different ways to the methyl 1-(dimethylcarbamoyl)-N-hydroxythioformimidate, as described below:

a. one half of the slurry obtained above is cooled to −10° C. and the solids are isolated by filtration. After a washing with ice water, the wet solids are dissolved in 150 parts of methanol at 30° C. To this solution is then added 16 parts of methyl mercaptan, followed by the addition at 30° C. of 20 parts of 50 percent aqueous sodium hydroxide solution in 150 parts of water until a stable pH of 7 is obtained. The reaction product starts to crystallize toward the end of the caustic addition. The methanol is removed from the resulting slurry by distillation until a head temperature of 50° C. at 100 mm is obtained; this operation removes the methanol and excess methyl mercaptan. The aqueous slurry is then cooled to 0°C. and the methyl 1-(dimethylcarbamoyl)-N-hydroxythioformimidate isolated by filtration. After one washing with ice water, and drying, there is obtained 36.5 parts of methyl 1-(dimethylcarbamoyl)-N-hydroxythioformimidate, melting point 183°–184° C.

b) One half of the slurry of dimethylcarbamoylformhydroxamoyl chloride obtained above is cooled to 0°C. and 14 parts of methyl mercaptan added, followed by the gradual addition of 60 parts of 50 percent aqueous sodium hydroxide solution at 0° to 10° C. until a stable pH of 7 is obtained. The resulting reaction mixture is then cooled to −10° C., the solids filtered off, washed with ice water, and dried. There is obtained 34 parts of methyl 1-(dimethylcarbamoyl)-N-hydroxythioformimidate, melting point 172°–180° C. One recrystallization from water gives a pure product, melting point 183°–184° C.

To a suspension of 70 parts of methyl 1-(dimethylcarbamoyl)-N-hydroxythioformimidate and ½ part of triethylenediamine in 350 parts of acetone at 40° C. is added slowly 27 parts of methyl isocyanate. The temperature of the reaction mass rises to 58° C. After the temperature of the reaction mass has subsided to 25° C., the solvent is evaporated under reduced pressure to obtain a crystalline residue. Recrystallization of the residue from benzene gives one crystalline form of methyl 1-(dimethylcarbamoyl)-N-(methylcarbamoyloxy)thioformimidate, melting point 109°–110° C. Recrystallization from water gives another crystalline form of methyl 1-(dimethylcarbamoyl)-N-(methylcarbamoyloxy)thioformimidate, melting point 101°–103° C.

The compounds of Table I are prepared by the procedures of Example I, using the mercaptans, amines and isocyanates listed in place of the methyl mercaptan, dimethylamine and methyl isocyanate of Example I.

TABLE I

| Mercaptan | Amine | Isocyanate | Product |
|---|---|---|---|
| Ethyl mercaptan | Dimethylamine | Methyl isocyanate | Ethyl 1-(dimethylcarbamoyl)-N-(methylcarbamoyloxy)thioformimidate. |
| Allyl mercaptan | do | do | Allyl 1-(dimethylcarbamoyl)-N-(methylcarbamoyloxy)thioformimidate. |
| But-2-enyl mercaptan | do | Ethyl isocyanate | But-2-enyl 1-(dimethylcarbamoyl)-N-(ethylcarbamoyloxy)thioformimidate. |
| Isopropyl mercaptan | do | Allyl isocyanate | Isopropyl 1-(dimethylcarbamoyl)-N-(allylcarbamoyloxy)thioformimidate. |
| Methyl mercaptan | do | Propargyl isocyanate | Methyl 1-(dimethylcarbamoyl)-N-(propargylcarbamoyloxy)thioformimidate. |
| Propyl mercaptan | do | Methyl isocyanate | Propyl 1-(dimethylcarbamoyl)-N-(methylcarbamoyloxy)thioformimidate. |
| Allyl mercaptan | do | Allyl isocyanate | Allyl 1-(dimethylcarbamoyl)-N-(allylcarbamoyloxy)thioformimidate. |
| Isopropyl mercaptan | do | Methyl isocyanate | Isopropyl 1-(dimethylcarbamoyl)-N-(methylcarbamoyloxy)thioformimidate. |
| Butyl mercaptan | do | do | Butyl 1-(dimethylcarbamoyl)-N-(methylcarbamoyloxy)thioformimidate. |
| sec-Butyl mercaptan | do | do | Sec-butyl 1-(dimethylcarbamoyl)-N-(methylcarbamoyloxy)thioformimidate. |
| tert-Butyl mercaptan | do | do | Tert-butyl 1-(dimethylcarbamoyl-)N(-methylcarbamoyloxy)thioformimidate. |
| Methyl mercaptan | do | Ethyl isocyanate | Methyl 1-(dimethylcarbamoyl)-N-(ethylcarbamoyloxy)thioformimidate. |
| Butyl mercaptan | do | do | Butyl 1-(dimethylcarbamoyl)-N-(ethylcarbamoyloxy)thioformimidate. |
| Methyl mercaptan | do | Isopropyl isocyanate | Methyl 1-(dimethylcarbamoyl-N-isopropylcarbamoyloxy)thioformimidate. |
| Butyl mercaptan | do | do | Butyl 1-(dimethylcarbamoyl)-N-(isopropylcarbamoyloxy)thioformimidate. |
| Allyl mercaptan | do | Propyl isocyanate | Allyl 1-(dimethylcarbamoyl)-N-(propylcarbamoyloxy)thioformimidate. |
| Methyl mercaptan | do | Allyl isocyanate | Methyl 1-(dimethylcarbamoyl)-N-(allylcarbamoyloxy)thioformimidate. |
| Buty mercaptan | do | do | Butyl 1-(dimethylcarbamoyl)-N-(allylcarbamoyloxy)thioformimidate. |
| Allyl mercaptan | do | Propargyl isocyanate | Allyl 1-(dimethylcarbamoyl)-N-(propargylcarbamoyloxy)thioformimidate. |

TABLE I—Continued

| Mercaptan | Amine | Isocyanate | Product |
|---|---|---|---|
| Methyl mercaptan | Methylamine | do | Methyl 1-(methylcarbamoyl)-N-(methylcarbamoyloxy)thioformimidate. |
| Do | Butylamine | do | Methyl 1-(butylcarbamoyl)-N-(methylcarbamoyloxy)thioformimidate. |
| Isopropyl mercaptan | Cyclopropylamine | do | Isopropyl 1-(cyclopropylcarbamoyl)-N-(methylcarbamoyloxy)thioformimidate. |
| Allyl mercaptan | N,O-dimethylhydroxylamine | Ethyl isocyanate | Allyl 1-(N-methoxy-N-methylcarbamoyl)-N-(ethylcarbamoyloxy)thioformimidate. |
| Ethyl mercaptan | Isopropylamine | Allyl isocyanate | Ethyl 1-(isopropyl carbamoyl)-N-(allylcarbamoyloxy)thioformimidate. |
| Methyl mercaptan | Ethylamine | Propargyl isocyanate | Methyl 1-(ethylcarbamoyl)-N-(propargylcarbamoyloxy)thioformimidate. |
| Do | Diethylamine | Methyl isocyanate | Methyl 1-(diethylcarbamoyl)-N-(methylcarbamoyloxy)thioformimidate. |
| Do | Diisopropylamine | do | Methyl 1-(diisopropylcarbamoyl)-N-(methylcarbamoyloxy)thioformimidate. |
| Do | Aziridine | do | Methyl 1-(aziridinocarbonyl)-N-(methylcarbamoyloxy)thioformimidate. |
| Do | Hexahydroazepine | do | Methyl 1-(hexahydroazepinocarbonyl)-N-(methylcarbamoyloxy)thioformimidate. |
| Do | Pyrrolidine | do | Methyl 1-(pyrrolidinocarbonyl)-N-(methylcarbamoyloxy)thioformimidate. |
| Do | Methylamine | Allyl isocyanate | Methyl 1-(methylcarbamoyl)-N-(allylcarbamoyloxy)thioformimidate. |
| Do | N,O-dimethylhydroxylamine | Methyl isocyanate | Methyl 1-(N-methoxy-N-methylcarbamoyl)-N-(methylcarbamoyloxy)thioformimidate. |
| Do | N-methyl-N-ethylamine | Allyl isocyanate | Methyl 1-(N-methyl-N-ethylcarbamoyl)-N-(allylcarbamoyloxy)thioformimidate. |
| Do | do | do | Methyl 1-(N-methyl-N-ethylcarbamoyl)-N-(methylcarbamoyloxy)thioformimidate. |
| Ethyl mercaptan | Piperidine | Allyl isocyanate | Ethyl 1-(piperidinocarbonyl)-N-(allylcarbamoyloxy)thioformimidate. |
| Do | do | Butyl isocyanate | Ethyl 1-(piperidinocarbonyl)-N-(butylcarbamoyloxy)thioformimidate. |
| Butyl mercaptan | do | Methyl isocyanate | Butyl 1-(piperidinocarbonyl)-N-(methylcarbamoyloxy)thioformimidate. |
| Do | do | Butyl isocyanate | Butyl 1-(piperidinocarbonyl)-N-(butylcarbamoyloxy)thioformimidate. |
| Methyl mercaptan | N-methyl-N-butylamine | Methyl isocyanate | Methyl 1-(N-methyl-N-butylcarbamoyl)-N-(methylcarbamoyloxy)thioformimidate. |

EXAMPLE II

To a solution of 30 parts of concentrated aqueous ammonia in 200 parts of water is added at 25° C. enough diketene to give a stable pH of 7; 36½ parts of diketene (0.435 moles) is required. The resulting solution is then sparged with nitrogen and 30.5 parts of sodium nitrite is added, followed by the gradual addition of 40 parts of 36 percent aqueous hydrochloric acid at 30° C. within 1 hour. A dark brown solution results, which is then treated at 30° C. within 1 hour with 31.5 parts of chlorine. After about ½ of the required amount of chlorine has been added, crystallization starts. When all of the chlorine has been added, the reaction mixture is agitated for another ½ hour. After cooling to −10° C., filtration, washing with ice water and drying, there is obtained 44.5 parts of carbamoylformhydroxamoyl chloride, melting point 162°–163°C.

Thirty-one parts of carbamoylformhydroxamoyl chloride, as obtained above, and 200 parts of water are cooled to 5° C. To this suspension is added 17 parts of methyl mercaptan, followed by the gradual addition of 50 percent aqueous sodium hydroxide solution to give a stable pH of 8. After agitation for an additional ½ hour, the slurry is cooled to 0° C., the solids filtered off, washed with ice water, and dried to give methyl 1-(carbamoyl)-N-hydroxythioformimidate, melting point 163°–164° C.

Twenty-six and eight-tenths parts of methyl 1-(carbamoyl)-N-hydroxythioformimidate, as obtained above, is treated as a suspension in 40 parts of acetone, containing ½ part of triethylenediamine, with 13 parts of methyl isocyanate. After the temperature of the reaction mass has begun to fall, the reaction mass is cooled to 0° C. and 36 parts of the product, methyl 1-(carbamoyl)-N-(methylcarbamoyloxy)thioformimidate, is filtered off; it exhibits a melting point of 161°–165 °C.

The compounds listed in Table II are prepared by the procedures given in Example II, using the mercaptans and isocyanates listed in place of methyl mercaptan and methyl isocyanate.

TABLE II

| Mercaptan | Isocyanate | Product |
|---|---|---|
| Ethyl mercaptan | Methyl isocyanate | Ethyl 1-carbamoyl-N-(methylcarbamoyloxy)thioformimidate. |
| Allyl mercaptan | do | Allyl 1-carbamoyl-N-(methylcarbamoyloxy)thioformimidate. |
| But-2-enyl mercaptan | Ethyl isocyanate | But-2-enyl 1-carbamoyl-N-(ethylcarbamoyloxy)thioformimidate. |
| Isopropyl mercaptan | Allyl isocyanate | Isopropyl 1-carbamoyl-N-(allylcarbamoyloxy)thioformimidate. |
| Methyl mercaptan | Propargyl isocyanate | Methyl 1-carbamoyl-N-(propargylcarbamoyloxy)thioformimidate. |
| Propyl mercaptan | Methyl isocyanate | Propyl 1-carbamoyl-N-(methylcarbamoyloxy)thioformimidate. |
| Allyl mercaptan | Allyl isocyanate | Allyl 1-carbamoyl-N-(allylcarbamoyloxy)thioformimidate. |
| Isopropyl mercaptan | Methyl isocyanate | Isopropyl 1-carbamoyl-N-(methylcarbamoyloxy)thioformimidate. |
| Butyl mercaptan | do | Butyl 1-carbamoyl-N-(methylcarbamoyloxy)thioformimidate. |
| Sec-butyl mercaptan | do | Sec-butyl 1-carbamoyl-N-(methylcarbamoyloxy)thioformimidate. |
| Tert-butyl mercaptan | do | Tert-butyl 1-carbamoyl-N-(methylcarbamoyloxy)thioformimidate. |
| Methyl mercaptan | Ethyl isocyanate | Methyl 1-carbamoyl-N-(ethylcarbamoyloxy)thioformimidate. |
| Butyl mercaptan | do | Butyl 1-carbamoyl-N-(ethylcarbomayloxy)thioformimidate. |
| Methyl mercaptan | Isopropyl isocyanate | Methyl 1-carbamoyl-N-(isopropylcarbamoyloxy)thioformimidate. |
| Butyl mercaptan | do | Butyl 1-carbamoyl-N-(isopropylcarbamoyloxy)thioformimidate. |
| Allyl mercaptan | do | Allyl 1-carbamoyl-N-(isopropylcarbamoyloxy)thioformimidate. |
| Do | n-Propyl isocyanate | Allyl 1-carbamoyl-N-(n-propylcarbamoyloxy)thioformimidate. |
| Methyl mercaptan | Allyl isocyanate | Methyl 1-carbamoyl-N-(allylcarbamoyloxy)thioformimidate. |
| Butyl mercaptan | do | Butyl 1-carbamoyl-N-(allylcarbamoyloxy)thioformimidate. |
| Allyl mercaptan | Propargyl isocyanate | Allyl 1-carbamoyl-N-(propargylcarbamoyloxy)thioformimidate. |

EXAMPLE III

To 690 parts of 26 percent aqueous dimethylamine and 1600 parts of water is added with agitation diketene at 20°–30° C. until a stable pH of 7 is obtained; three hundred thirty-six and two-tenths parts of diketene is required. In the resulting solution is then dissolved 280 parts of sodium nitrite, followed by the gradual addition of 400 parts of 36 percent aqueous hydrochloric acid under a nitrogen atmosphere at 30° C. The resulting 2-hydroxyimino-N,N- dimethylacetoacetamide, melting point 122°–124° C., crystallizes toward the end of the hydrochloric acid addition and can be isolated by cooling of the solution and filtration. Without isolating the oxime, the reaction mixture is treated within 60 minutes at 30° C. with 288 parts of chlorine. At the beginning of the chlorination the oxime goes into solution and the reaction product begins to crystallize shortly thereafter. When all of the chlorine has been added, the resulting reaction mixture is agitated for ½ hour, followed by cooling to −10° C., filtration, washing with water and drying of the solids.

dropwise at 15°–25° C. Stirring is continued for one hour after the completion of the addition. The inorganic solids are then removed by filtration and the methyl 1-carbamoyl-N-(dimethylcarbamoyloxy)thioformimidate is recovered by removal of the solvent under reduced pressure.

The compounds of Table III are prepared according to the procedures of Example V using the N-hydroxythioformimidates and carbamoyl chlorides listed in place of methyl 1-(carbamoyl)-N-hydroxythioformimidate and dimethylcarbamoyl chloride.

TABLE III

| N-hydroxythioformimidate | Carbamoyl chloride | Product |
|---|---|---|
| Methyl 1-carbamoyl-N-hydroxythioformimidate | N-allyl-N-methylcarbamoyl chloride | Methyl 1-carbamoyl-N-(N-allyl-N-methylcarbamoyloxy)thioformimidate. |
| Do | N-methyl-N-propargycarbamoyl chloride | Methyl 1-carbamoyl-N-(N-methyl-N-propargylcarbamoyloxy)thioformimidate. |
| Do | N-methyl-N-propylcarbamoyl chloride | Methyl 1-carbamoyl-N-(N-methyl-N-propylcarbamoyloxy)thioformimidate. |
| Do | N-ethyl-N-methylcarbamoyl chloride | Methyl 1-carbamoyl-N-(N-ethyl-N-methylcarbamoyloxy)thioformimidate. |
| Methyl 1-methylcarbamoyl-N-hydroxythioformimidate. | Dimethylcarbamoyl chloride | Methyl 1-(methylcarbamoyl)-N-(dimethylcarbamoyloxy)thioformimidate. |
| Methyl 1-dimethylcarbamoyl-N-hydroxythioformimidate. | do | Methyl 1-(dimethylcarbamoyl)-N-(dimethylcarbamoyloxy)thioformimidate. |
| Methyl 1-cyclopentylcarbamoyl-N-hydroxythioformimidate. | do | Methyl 1-(cyclopentylcarbamoyl)-N-(dimethylcarbamoyloxy)thioformimidate. |
| Propyl 1-carbamoyl-N-hydroxythioformimidate | do | Proyl 1-carbamoyl-N-(dimethylcarbamoyloxy)thioformimidate. |
| Ethyl 1-carbamoyl-N-hydroxythioformimidate | do | Ethyl 1-carbamoyl-N-(dimethylcarbamoyloxy)thioformimidate. |
| Butyl 1-carbamoyl-N-hydroxythioformimidate | do | Butyl 1-carbamoyl-N-(dimethylcarbamoyloxy)thioformimidate. |

There is obtained 561 parts of dimethylcarbamoylformhydroxamoyl chloride (93 percent yield based on diketene) melting point 140°–144° C.

EXAMPLE IV

To a solution of 79 parts of 2-hydroxyimino-N,N-dimethylacetoacetamide in 200 parts of water at 30° C. is gradually added within 45 to 60 minutes 36 parts of chlorine with good agitation. As the chlorination progresses the resulting reaction product crystallizes. When all of the chlorine has been added the reaction mixture is agitated at 30° C. for an additional ½ hour, during which time all of the chlorine has been consumed and the reaction mixture has become colorless. Cooling to −10° C., removal of the solids by filtration, and washing and drying the solids gives 69.7 parts of dimethylcarbamoylformhydroxamoyl chloride, melting point 141°–146° C.

EXAMPLE V

To a stirred suspension of 48 parts of 50 percent sodium hydride and mineral oil in 648 parts of tetrahydrofuran is added portion-wise over a one-hour period 114 parts of methyl 1-(carbamoyl)-N-hydroxythioformimidate. The temperature is maintained at 20° to 30° C. After subsidence of hydrogen evolution, 107.5 parts of dimethylcarbamoyl chloride is added

We claim:
1. A process for chlorinating 2-hydroxyiminoacetoacetamides of the formula

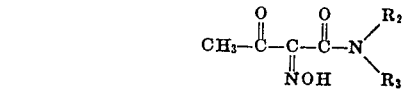

wherein
$R_2$ is hydrogen, alkyl of one through four carbon atoms, methoxy, or cycloalkyl of three through five carbon atoms; and
$R_3$ is hydrogen or alkyl of one through four carbon atoms; with the proviso that $R_2$ and $R_3$ can be taken together and are alkylene of two through six carbon atoms, and with the limitation that $R_2$ and $R_3$ never total more than seven carbon atoms;
to the corresponding hydroxamoyl chlorides comprising chlorinating the formula compound at a temperature between about −10° C. and 75° C. in water, methanol, ethanol, isopropanol, their mixtures, or their mixtures with dimethylformamide, the chlorine being used in approximately stoichiometric amounts.

2. The process of claim 1 wherein the chlorination is carried out in water, at a temperature between about 20° C. and 50° C.

* * * * *